(12) United States Patent
Byrnes et al.

(10) Patent No.: US 10,599,414 B2
(45) Date of Patent: Mar. 24, 2020

(54) ADAPTIVE DEPLOYMENT OF APPLICATIONS FOR MOBILE DEVICES

(71) Applicant: OATH INC., New York, NY (US)

(72) Inventors: Sean N. Byrnes, San Francisco, CA (US); Gabriel J. Vanrenen, San Francisco, CA (US); Karl B. Harris, Austin, TX (US)

(73) Assignee: OATH INC., New York, NY (US)

( * ) Notice: Subject to any disclaimer, the term of this patent is extended or adjusted under 35 U.S.C. 154(b) by 24 days.

(21) Appl. No.: 15/340,296

(22) Filed: Nov. 1, 2016

(65) Prior Publication Data

US 2017/0052775 A1  Feb. 23, 2017

Related U.S. Application Data

(63) Continuation of application No. 11/594,555, filed on Nov. 7, 2006, now Pat. No. 9,489,187.

(60) Provisional application No. 60/846,285, filed on Sep. 20, 2006, provisional application No. 60/734,185, filed on Nov. 7, 2005.

(51) Int. Cl.
| | |
|---|---|
| *G06F 9/445* | (2018.01) |
| *G06F 8/61* | (2018.01) |
| *H04L 29/04* | (2006.01) |
| *H04L 29/08* | (2006.01) |
| *H04L 12/24* | (2006.01) |
| *G06F 8/41* | (2018.01) |
| *G06F 8/71* | (2018.01) |

(52) U.S. Cl.
CPC .................. *G06F 8/64* (2013.01); *G06F 8/41* (2013.01); *G06F 8/61* (2013.01); *G06F 8/71* (2013.01); *H04L 29/04* (2013.01); *H04L 41/0816* (2013.01); *H04L 67/303* (2013.01); *H04L 67/34* (2013.01); *H04L 67/02* (2013.01)

(58) Field of Classification Search
CPC ......................................................... G06F 8/64
USPC ......................................................... 717/177
See application file for complete search history.

(56) References Cited

U.S. PATENT DOCUMENTS

| | | | |
|---|---|---|---|
| 6,029,000 A | 2/2000 | Woolsey et al. | |
| 6,128,661 A | 10/2000 | Flanagin et al. | |
| 6,438,749 B1 | 8/2002 | Chamberlain | |
| 6,496,979 B1* | 12/2002 | Chen .................. | G06F 8/61 |
| | | | 717/178 |
| 6,553,375 B1 | 4/2003 | Huang et al. | |
| 6,578,199 B1 | 6/2003 | Tsou et al. | |
| 6,816,944 B2 | 11/2004 | Peng | |
| 6,944,772 B2 | 9/2005 | Dozortsev | |
| 6,985,876 B1 | 1/2006 | Lee | |
| 7,373,422 B1 | 5/2008 | Paul | |
| 7,428,750 B1 | 9/2008 | Dunn | |

(Continued)

*Primary Examiner* — Evral E Bodden
(74) *Attorney, Agent, or Firm* — James J. DeCarlo; Greenberg Traurig, LLP

(57) ABSTRACT

A method of installing an application on a mobile user device is disclosed. A request for the application is received. Information is received related to the mobile user device on which the application is to be installed. A version of an application is determined to send in response to the request for the application and the information related to the mobile user device. The application version is sent to the mobile user device. Information is received related to the performance of the application version. Adapted application determination information is stored related to at least a portion of the received information.

21 Claims, 8 Drawing Sheets

(56) References Cited

U.S. PATENT DOCUMENTS

| | | | |
|---|---|---|---|
| 7,734,357 B2 | 6/2010 | Wolf | |
| 7,802,246 B1* | 9/2010 | Kennedy | G06F 9/4446 |
| | | | 717/173 |
| 8,140,475 B1 | 3/2012 | Sparks | |
| 2001/0037254 A1 | 11/2001 | Glikman | |
| 2003/0217126 A1 | 11/2003 | Polcha | |
| 2004/0034853 A1 | 2/2004 | Gibbons | |
| 2006/0073785 A1* | 4/2006 | Klassen | H04W 76/45 |
| | | | 455/3.01 |
| 2006/0274869 A1* | 12/2006 | Morse | G06F 17/30905 |
| | | | 375/352 |
| 2007/0041344 A1* | 2/2007 | Yaqub | H04W 36/005 |
| | | | 370/331 |
| 2007/0220032 A1* | 9/2007 | Kapoor | G06F 8/61 |
| 2007/0244582 A1 | 10/2007 | Wolf | |
| 2008/0109528 A1 | 5/2008 | Knight | |
| 2009/0052359 A1* | 2/2009 | Yerubandi | H04L 67/04 |
| | | | 370/310 |

* cited by examiner

US 10,599,414 B2

ADAPTIVE DEPLOYMENT OF APPLICATIONS FOR MOBILE DEVICES

CROSS REFERENCE TO OTHER APPLICATIONS

This application is a continuation of U.S. Non-Provisional Application No. 11/594,555, filed on Nov. 7, 2006, entitled "Adaptive deployment of applications for mobile devices," which claims priority to U.S. Provisional Patent Application No. 60/734,185 entitled REAL-TIME GENERATION OF CUSTOMIZED APPLICATION EXECUTABLE DURING INSTALLATION PROCESS FOR MOBILE DEVICES filed Nov. 7, 2005 which is incorporated herein by reference for all purposes and claims priority to U.S. Provisional Patent Application No. 60/846,285 entitled ADAPTIVE DEPLOYMENT OF APPLICATIONS FOR MOBILE DEVICES filed Sep. 20, 2006 which is incorporated herein by reference for all purposes.

BACKGROUND OF THE INVENTION

Installing applications for mobile devices pose significant challenges, as each device is different and requires a different software implementation. Even more complicated are applications that are installed over a network onto the device, based on a user's request, since no prior knowledge of the device exists. One additional challenge is that mobile devices and mobile device networks evolve and change over time.

The conventional approach for the application installer is to compile an application multiple times, once for each device type, and allow the application user to choose one of the compiled programs, based on her device type. There are several disadvantages with this approach: First, it requires a large amount of programming labor to research and compile the program for every device type. Second, it requires all executables to be compiled ahead of time and the approach can only be applied to devices that exist at the time of compilation. Third, it requires the network server provide sufficient storage for all of the versions of the application. Fourth, it requires that the application user have correct knowledge of her device type. Fifth, it cannot adapt to changing conditions in the mobile device, carrier or network.

Therefore, there exists a need for an efficient, effective and adaptive way to install an application for a mobile device.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
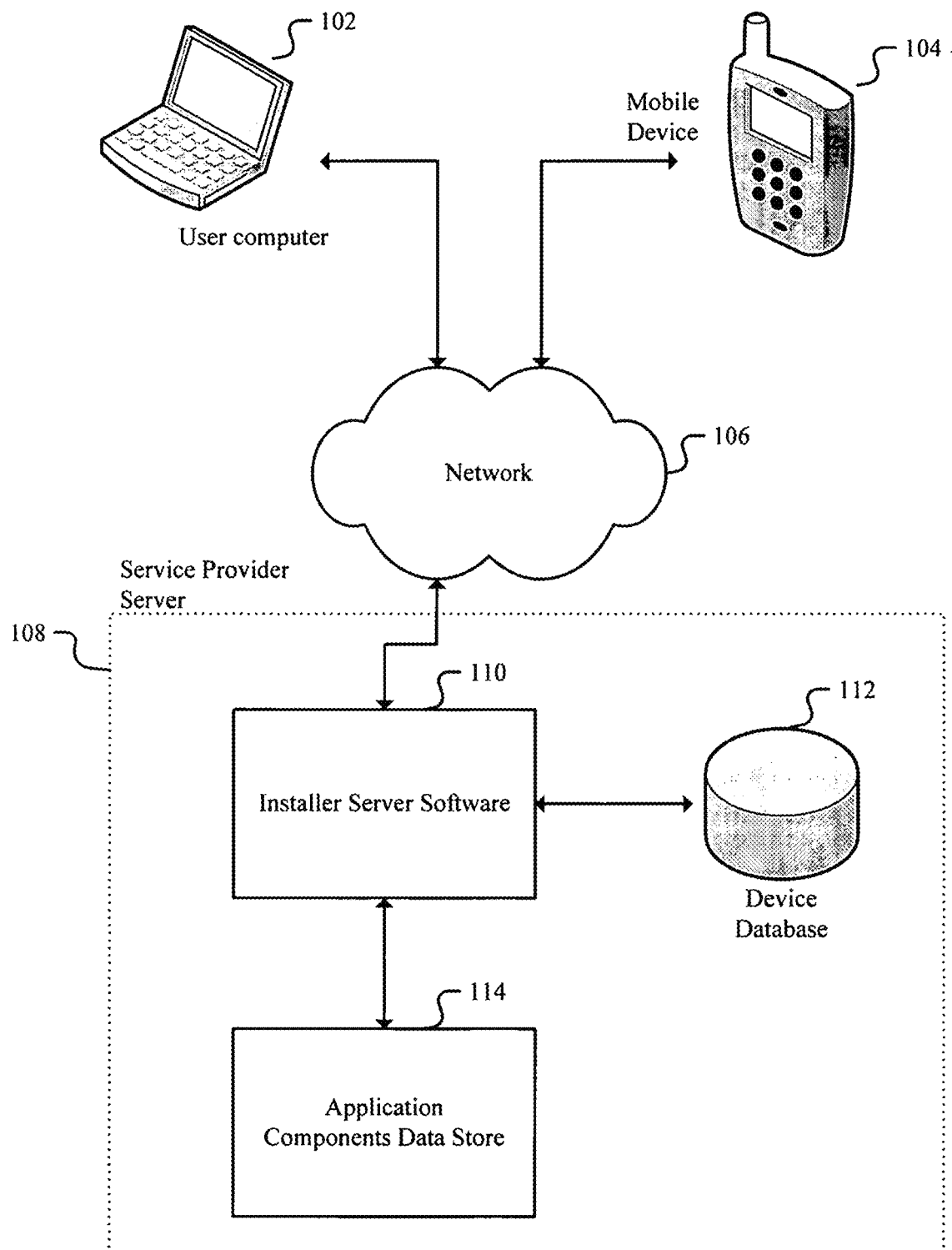
FIG. 1 is a block diagram illustrating an embodiment of a system for a service provider to install an application to a mobile device.

FIG. 1 is a block diagram illustrating an embodiment of a system for a service provider to install an application to a mobile device. User computer 102, mobile device 104, and service provider server 108 are connected through network 106, a public or private network and/or combination thereof, for example the Internet, an Ethernet, serial/parallel bus, intranet, NAS, SAN, LAN, WAN, and other forms of connecting multiple systems and/or groups of systems together. The service provider server 108 is at least comprised of the installer server software 110, a device database 112, and an application component data store 114. In some embodiments, user computer 102 may be another mobile device or any network-capable device.

In some embodiments, the device database 112 contains information such as a mobile device index, an amount of memory on a mobile device, certain capabilities of a mobile device and limitations of a mobile device. In some embodiments, the application component data store 114 contains the parts that can be assembled into variations of the program, including: device-specific libraries, configuration parameters, security components and functional components. In some embodiments, specifications from the device database 112 map to a component or groups of components in the application components data store 114 so that the installer server software 110 can easily determine what components are needed for a given specification.

Figure 2:
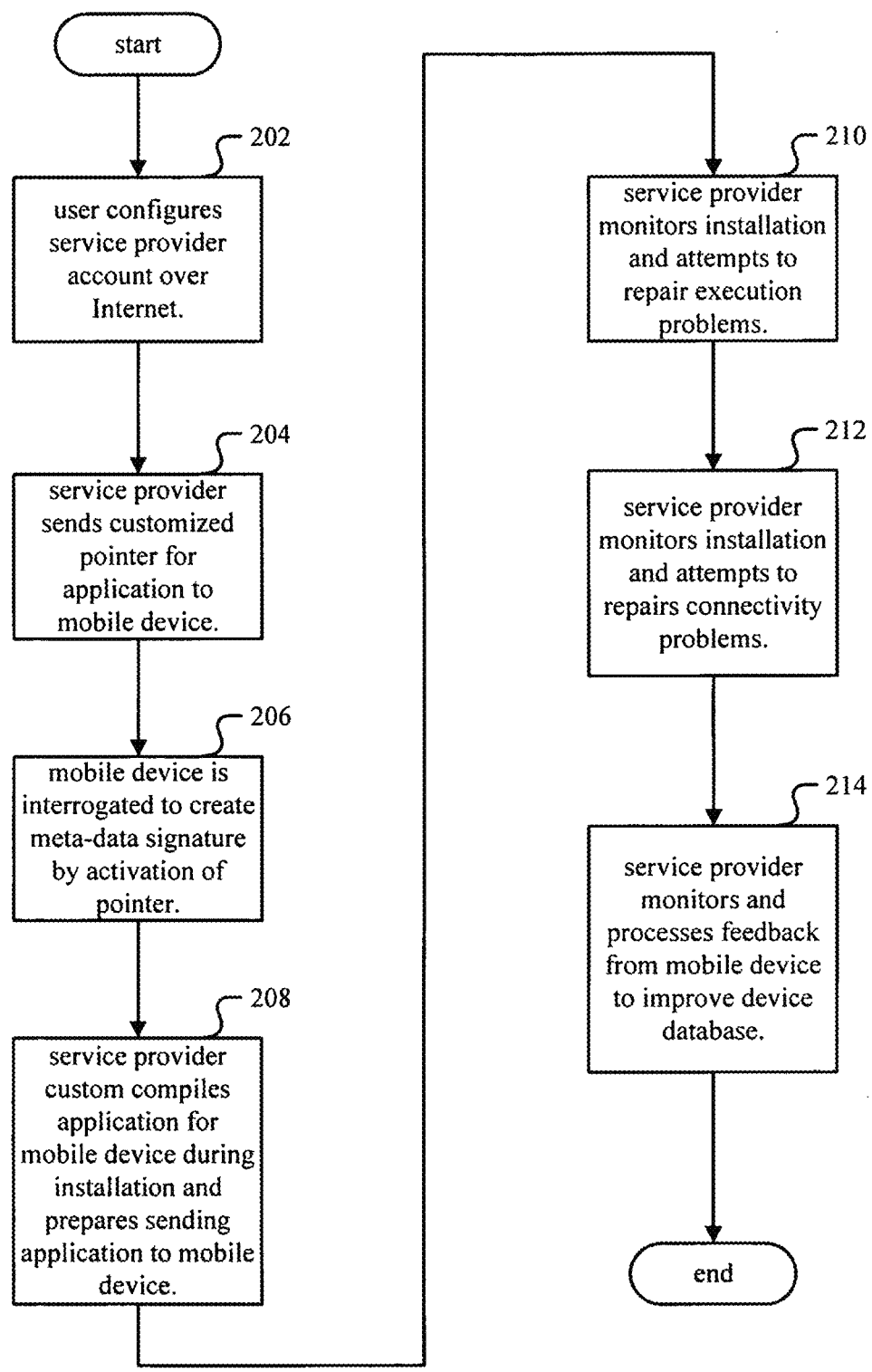
FIG. 2 is a flowchart illustrating an embodiment of a process for a service provider to install an application to a mobile device.

FIG. 2 is a flowchart illustrating an embodiment of a process for a service provider to install an application to a mobile device. The process may be implemented in service provider server 108.

In a step 202, a user of the service provider configures their service provider account over the network 106 using user computer 102 or mobile device 104. The service provider server assigns a user identifier for the service provider account. In some embodiments, this step may be performed over the Internet using a web browser using Hypertext Transfer Protocol (or HTTP) with user computer 102 or Wireless Application Protocol (or WAP) with mobile device 104 or another mobile device.

In a step 204, the service provider sends a customized pointer for the application to be installed to mobile device 104 that contains the user identifier. The customized pointer is a pointer to a specific customized configuration of the application for the individual user. It is customized based on information typically entered by the user over the web using a browser in step 202. Other methods of interacting with a user are used in other embodiments. The application of customized configuration may include a standard compiled program plus configuration data. The application of customized configuration may also include a custom compiled program with embedded configuration data. Combinations of these techniques are also used. When the customized pointer is activated, a customized install of the application is performed so that the user need not configure the application on his mobile device. In some embodiments, the customized pointer may be a Short Message Service (or SMS) message or email message customized to the service provider account configured in step 202.

In a step 206, while the mobile device 104 activates the pointer of step 204, the mobile device 104 is interrogated by the installer server software 110, and creates a "meta-data signature" based on the interrogation. In some embodiments, the interrogation may be performed with an HTTP request to the mobile device 104, and parsing the request response to create the meta-data signature is performed by installer server software 110. In a step 208, the service provider server 108 custom compiles an application for the mobile device 104 based on the interrogation of step 206, and sends the application to mobile device 104.

In a step 210, the installer server software 110 is sent a message if the application installed can be executed and attempts to repair any execution problems if this message indicates an error. It the message does not indicate an error, the device database 112 is updated with an installation success for the corresponding mobile device 104 and its meta-data signature, and the template, components, and/or parameters used in its compilation. In some embodiments, a new template may be created in device database 112 based on an installation success. In some embodiments, this message may include a generic error message or a specific error message from the Mobile Information Device Profile 2.0 (or MIDP 2.0) specification. In some embodiments, applications written with Java 2 Platform Micro Edition (or J2ME) send an HTTP code.

In a step 212, the installer server software 110 is sent an initial communication over network 106 when the application first executes, and service provider server 108 attempts to repair any connectivity problems if this communication is not received. It the communication is received successfully, the device database 112 is updated with an connectivity success for the corresponding mobile device 104 and its meta-data signature, and the template, components, and/or parameters used in its compilation. In some embodiments, a new template may be created in device database 112 based on a connectivity success. In some embodiments, the application is written in Java, and this communication is performed using the General Packet Radio Service (or GPRS) or Evolution Data Optimized (EV-DO) service.

In a step 214, if the application executes and can connect through the network 206 to the service provider server 108, the service provider continues to monitor and process feedback from the application from mobile device 104. Additional feedback may be sourced from use of the application's features, a change in the mobile device 104, a change in the network 106, or other system changes. This feedback is used to update the device database 112 for future installations with new mobile devices having the same or similar meta-data signature. This step 214 will be continually provided by the service provider server 108 for an extended period of time.

Figure 3:
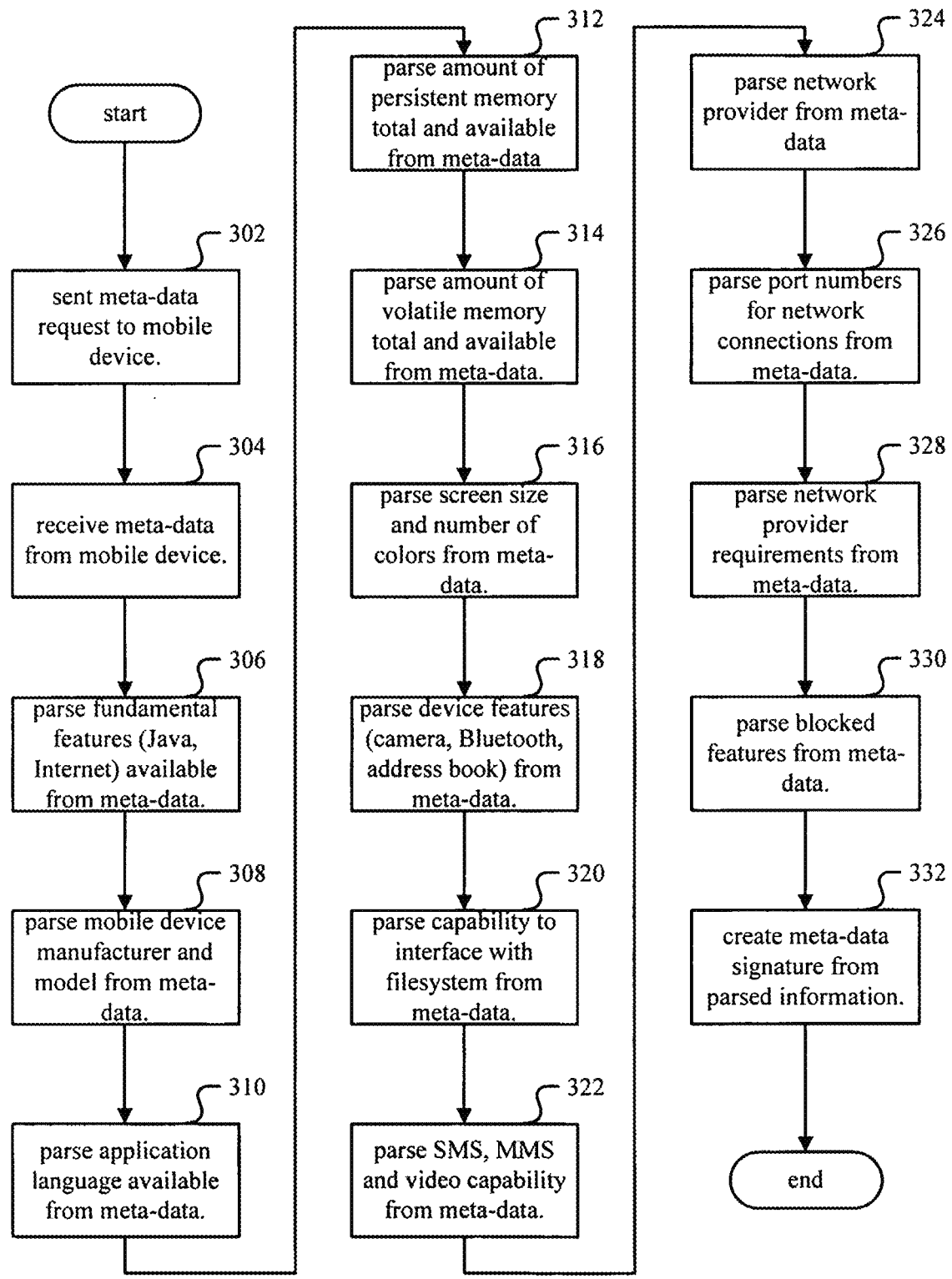
FIG. 3 is a flowchart illustrating an embodiment of a process for a service provider to interrogate a mobile device to create a meta-data signature.

FIG. 3 is a flowchart illustrating an embodiment of a process for a service provider to interrogate a mobile device to create a meta-data signature. In some embodiments, the process of FIG. 3 is included in 206 of FIG. 2. The process may be implemented in installer server software 110.

In a step 302, the installer server software 110 sends a meta-data request to mobile device 104. In some embodiments, the meta-data request may be done through an HTTP request. In some embodiments, the meta-data can contain the User-Agent (a unique string for any mobile device, providing a unique identification of mobile device 104,) the X-WAP-Profile (a Uniform Resource Locator (or URL) of the Resource Description Framework (or RDF) for the mobile device 104, wherein the RDF follows the Open Mobile Alliance's layout for device information,) and the Via (Information about the network gateway the mobile device 104 is using to reach the network 106.)

In a step 304, the installer server software 110 receives the meta-data from mobile device 104. The installer server software 110 can then implement all, some, or none of the following steps 306 through 330, depending on the particular embodiment, service provider, and application: In a step 306, the installer server software determines from the received meta-data whether fundamental requirements are available on mobile device 104. In some embodiments, fundamental requirements include whether Java applications can be run on the mobile device 104, or whether Internet access is available for applications on mobile device 104. In a step 308, the installer server software parses the mobile device manufacturer and model, from the received meta-data.

In a step 310, the installer server software 110 parses the application language available, from the received meta-data. In some embodiments, the installer server software 110 parses what version of Java is used, MIDP 1.0 or 2.0, from the received meta-data. In some embodiments, the installer server software 110 parses what Java Application Programming Interfaces (or APIs) are available on mobile device 104, from the received meta-data. In a step 312, the installer server software 110 parses the amount of persistent memory in the mobile device 104, from the received meta-data, and parses what amount of persistent memory is available for the application to be installed, from the received meta-data. In some embodiments, the persistent memory can be in the form of flash memory, Electrically Erasable Programmable Read-Only Memory (or EEPROM), or a hard disk.

In a step 314, the installer server software 110 parses the amount of volatile memory in the mobile device 104, from the received meta-data, and parses what amount of volatile memory is available for the application to be installed, from the received meta-data. In some embodiments, the volatile memory can be in the form of Static Random Access Memory (or SRAM) or Dynamic Random Access Memory (or DRAM). In a step 316, the installer server software 110 parses the screen size and number of colors of the mobile device 104, from the received meta-data. In some embodiments the number of colors can include a simple determination whether the mobile device 104 has a monochrome or color display.

In a step 318, the installer server software 110 parses a list of predetermined features of the mobile device 104, from the received meta-data. In some embodiments, the features may include a camera, a Bluetooth wireless protocol interface, or an address book in a specific format. In a step 320, the installer server software 110 parses the available protocols with which to interface the filesystem of the mobile device 104, from the received meta-data. In a step 322, the installer server software 110 parses whether SMS, Multimedia Messaging Service (or MMS), and/or video capability is available from mobile device 104, from the received meta-data.

In a step 324, the installer server software 110 parses the network provider for mobile device 104, from the received meta-data. In some embodiments the network provider can include the cellular phone network carrier for mobile device 104. In a step 326, the installer server software 110 parses the port numbers required for connection to network 106, from the received meta-data. In a step 328, the installer server software 110 parses whether the mobile device 110 or network provider has any other application requirements for execution, from the received meta-data. In some embodiments, the application requirements may include whether an application must be digitally signed in order to be executed. In a step 330, the installer server software 110 parses whether features available from mobile device 104 are being blocked by the network provider, from the received meta-data. In a step 332, the installer server software 110 combines all, some, or none of the information parsed from steps 306 through 330 and creates a meta-data signature based on a proper subset of this parsed information. This meta-data signature can be generated regardless of whether the mobile device 104 was previously unknown, as it requires no a priori knowledge. In some embodiments, the meta-data signature have a hierarchical relationship, for example a more generic meta-data signature would indicate a color display, and a more specific meta-data signature related to the generic meta-data signature would indicate a color display with 256 colors.

Figure 4:
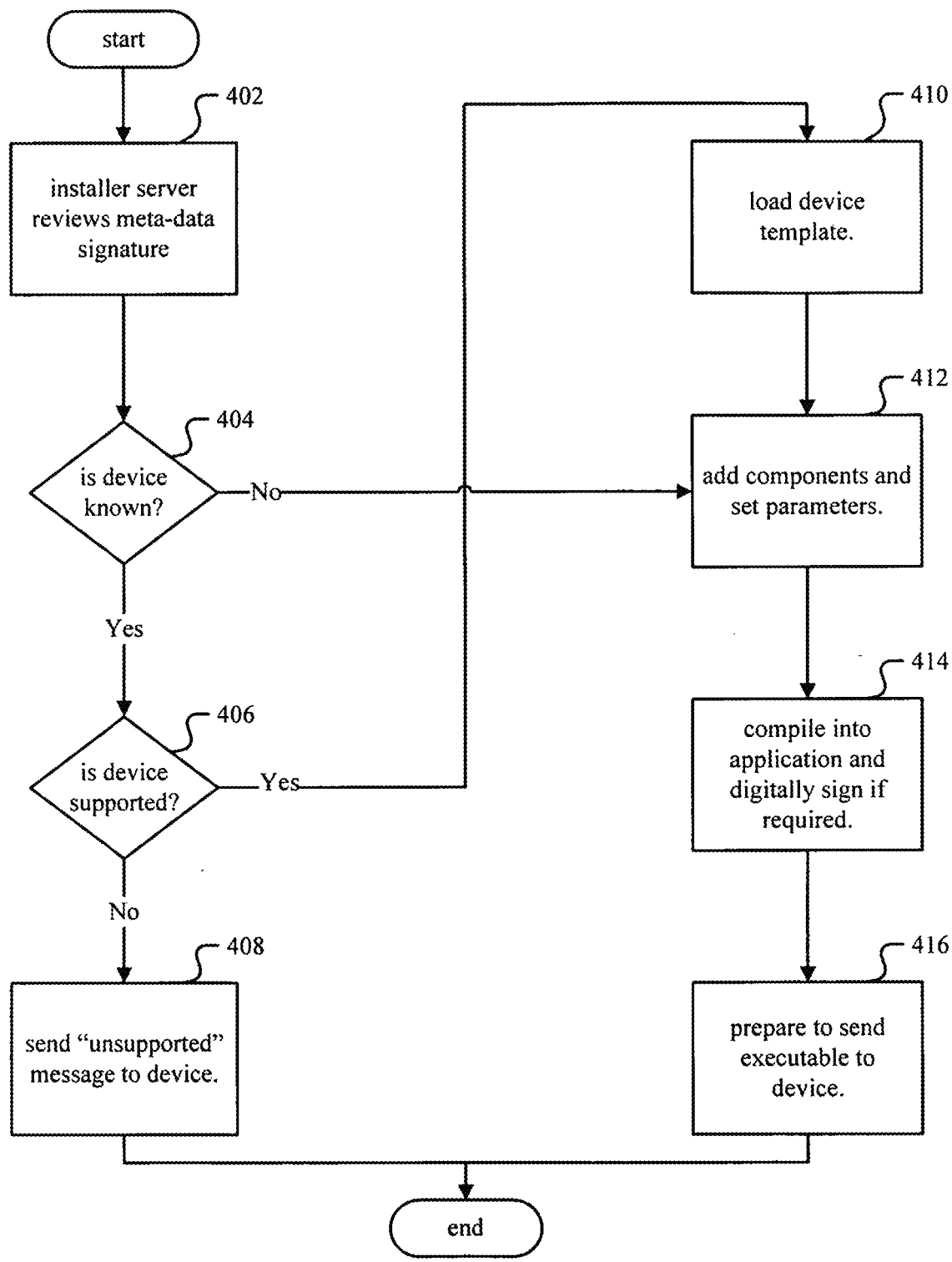
FIG. 4 is a flowchart illustrating an embodiment of a process for a service provider to custom compile an application for a mobile device.

FIG. 4 is a flowchart illustrating an embodiment of a process for a service provider to custom compile an application for a mobile device. In some embodiments, the process of FIG. 4 is included in 208 of FIG. 2. The process may be implemented in service provider server 108.

In a step 402, the installer server software 110 reviews the meta-data signature from step 206. If it is determined at step 404 that the mobile device 104 is known because it has a corresponding entry for the meta-data signature in the device database 112, and if it is determined at step 406 that the device does not support the application, then control is transferred to step 408, where the installer server software 110 displays predefined content to the mobile device 104 in lieu of the application executable binary indicating that the mobile device 104 is not supported by the application. Such predefined content can be delivered in a format and protocol appropriate to the mobile device 104 based on the meta-data signature.

If it is determined at step 404 that the mobile device 104 is known because it has a corresponding entry for the meta-data signature in the device database 112, and if it is determined at step 406 that the device does support the application, then control is transferred to step 410. In a step 410, the installer server software 110 loads a corresponding device "template" that includes a set of predetermined application components that are currently optimal for that device. A template is used for simplicity, as they reduce the computational burden on installer server software 110 by supplying groupings of components that are common and known. In some embodiments, the meta-data signature mapping to templates is hierarchical, for example a meta-data signature indicating a color display would share components with a meta-data signature indicating a color display with 256 colors. Control is transferred to step 412.

If it is determined at step 404 that the mobile device 104 is not known because it has no corresponding entry for the meta-data signature in the device database 112, then control is transferred to step 412. The benefit of the proposed system is that because no a priori information is required to set up this system, a mobile device can be easily added to the device database 112 without requiring changes to the application logic, and this allows for straightforward addition of new devices and even handling of mobile devices not yet entered into the device database 112 but whose meta-data signatures match existing mobile devices.

In a step 412, the installer server software 110 adds components and sets parameters based on the parsed meta-data and the user identifier in step 202. The parsed meta-data can include meta-data not part of the meta-data signature. In some embodiments this parsed meta-data not part of the meta-data signature can include the amount of persistent memory currently available in mobile device 104. The user identifier can be looked up in the service provider system 208 to set parameters including "credentials". The benefit of allowing for credentials to be compiled into the application for a specific mobile device 104 is that this integrated security is harder to circumvent and allows for more complex security protocols. In some embodiments, the credentials include a user name and password associated with the service provider account. In some embodiments, the credentials include an email address, a password associated with an email address, and/or a mailserver configuration associated with an email address.

In a step 414, the installer server software 110 compiles the custom set of components and parameters identified in steps 410 and 412 into a single application executable. If it was determined from the parsed meta-data that the mobile device 104 or network provider requires digitally signed applications, the installer server software 110 digitally signs the application. The compilation in this step is specific to the platform for mobile device 104. In some embodiments, if the mobile device 104 platform is a J2ME platform, the components would be compiled into a JAD/JAR package. In a step 416, the installer server software 110 prepares to send the application executable device to the mobile device 104, using a protocol appropriate to the mobile device 104 as parsed by the meta-data.

Figure 5:
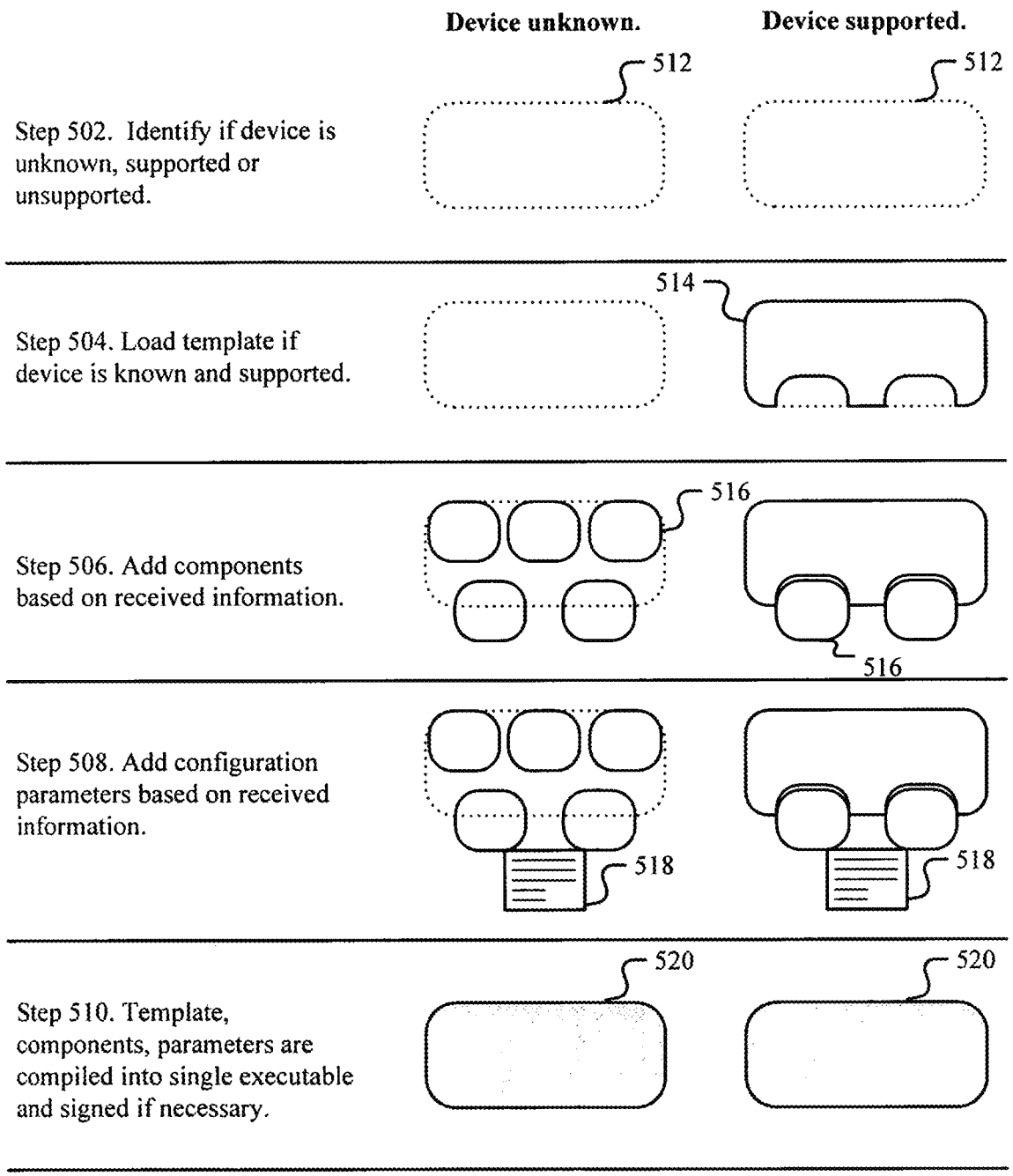
FIG. 5 is a diagram illustrating an example application construction flow in the two cases of a previously unknown mobile device and a known and supported mobile device.

FIG. 5 is a diagram illustrating an example application construction flow in the two cases of a previously unknown mobile device and a known and supported mobile device. In a step 502, like in step 404 and 406, the mobile device 104 is identified as either unknown, supported, or unsupported. If the mobile device 104 is not unsupported, the application construction flow can proceed.

In the case where the mobile device 104 is unknown: In a step 504, no template can be loaded with an unknown mobile device 104 and the generic application boilerplate 512 is not loaded with any components. In a step 506, the application is built using components 516. In a step 508, the configuration parameters 518 including credentials are added to the application. In a step 510, the components and parameters are compiled into a single executable and signed if necessary.

In the case where the mobile device 104 is supported: In a step 504, the template corresponding to the mobile device 104's meta-data signature is loaded into the generic application boilerplate 512. In a step 506, specific components 516 can be added to the template if necessary. In a step 508, the configuration parameters 518 including credentials are added to the application. In a step 510, the components and parameters are compiled into a single executable and signed if necessary.

The order in which components are added do not matter, as consolidation and linking does not occur until the step 510 when compilation occurs. In some environments, it is also possible that compilation and linking is a multi-step process, where some compilation takes place between steps 502-510. In these cases the flow is adjusted based on the platform supported by the device.

Figure 6:
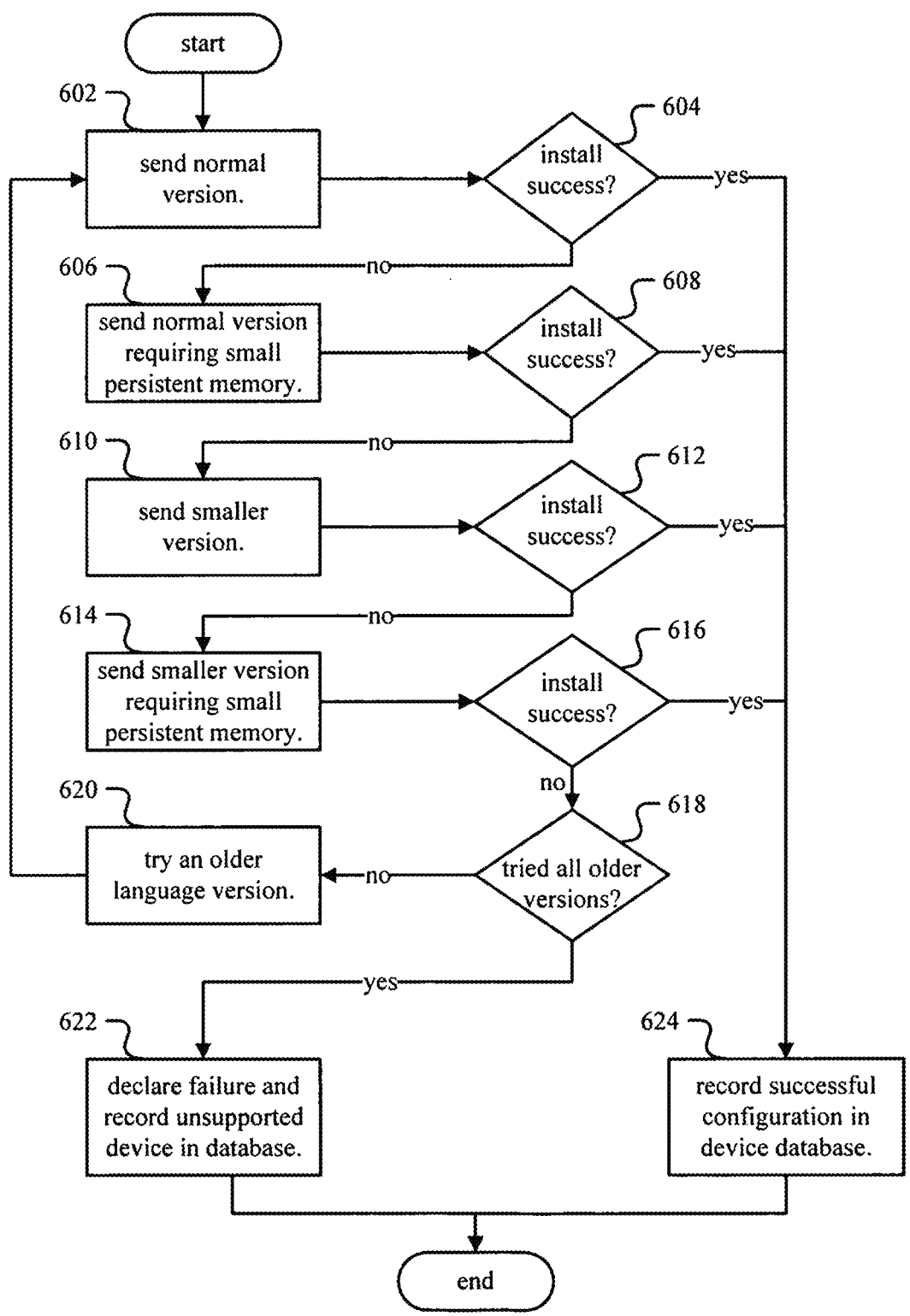
FIG. 6 is a flowchart illustrating an embodiment of a process for a service provider to attempt to monitor and repair execution problems.

FIG. 6 is a flowchart illustrating an embodiment of a process for a service provider to attempt to monitor and repair execution problems. In some embodiments, the process of FIG. 6 is included in 210 of FIG. 2. The process may be implemented in service provider server 108.

In a step 602, the installer server software 110 sends the "normal version" of the application, which is not optimized for smaller size. If it is determined at step 604 that installation of the normal version is successful, then control is transferred to step 624. If it is determined at step 604 that installation of the normal version is unsuccessful, then control is transferred to step 606.

In a step 606, the installer server software 110 updates the device database 112 for the mobile device 104 and its meta-data signature, and recompiles an application executable following step 208 but with a template and/or components optimized for a small persistent memory. The installer server software 110 sends this version to the mobile device 104. In some embodiments, the installer server software 110 cannot automatically re-install this new version of the application, but must send a "retry message" to the mobile device 104 to start the process from step 206, and in some embodiments this retry message is sent using a customized SMS message.

If it is determined at step 608 that installation of the version sent in step 606 is successful, then control is transferred to step 624. If it is determined at step 608 that installation of the version sent in step 606 is unsuccessful, then control is transferred to step 610.

In a step 610, the installer server software 110 updates the device database 112 for the mobile device 104 and its meta-data signature, and recompiles an application executable following step 208 but a "smaller version", with a template and/or components optimized for a smaller size with a normal persistent memory. The installer server software 110 sends this version to the mobile device 104. In some embodiments, the installer server software 110 cannot automatically re-install this new version of the application, but must send a retry message to the mobile device 104 to start the process from step 206, and in some embodiments this retry message is sent using a customized SMS message.

If it is determined at step 612 that installation of the version sent in step 610 is successful, then control is transferred to step 624. If it is determined at step 612 that installation of the version sent in step 610 is unsuccessful, then control is transferred to step 614.

In a step 614, the installer server software 110 updates the device database 112 for the mobile device 104 and its meta-data signature, and recompiles an application executable following step 208 but with a template and/or components optimized for a smaller size with a small persistent memory. The installer server software 110 sends this version to the mobile device 104. In some embodiments, the installer server software 110 cannot automatically re-install this new version of the application, but must send a retry message to the mobile device 104 to start the process from step 206, and in some embodiments this retry message is sent using a customized SMS message.

If it is determined at step 616 that installation of the version sent in step 614 is successful, then control is transferred to step 624. If it is determined at step 616 that installation of the version sent in step 614 is unsuccessful, then control is transferred to step 618.

If it is determined at step 618 that the installer server software 110 has tried all older versions of the language and/or operating environment, then control is transferred to step 622. If it is determined at step 618 that the installer server software 110 has not tried all older versions of the language and/or operating environment, then control is transferred to step 620.

In a step 620, the installer server software 110 prepares to repeat installation starting at step 602, but with an older language and/or operating environment. In some embodiments, Java is the language used and the installer server software 110 would try MIDP 1.0 instead of MIDP 2.0.

In a step 622, the service provider server 108 declares the installation a failure and records the mobile device 104 and its meta-data signature in the device database 112 as an unsupported device.

In a step 624, the device database 112 is updated with an installation success for the corresponding mobile device 104 and its meta-data signature, and the template, components, and/or parameters used in its compilation. In some embodiments, a new template may be created in device database 112 based on an installation success.

Figure 7:
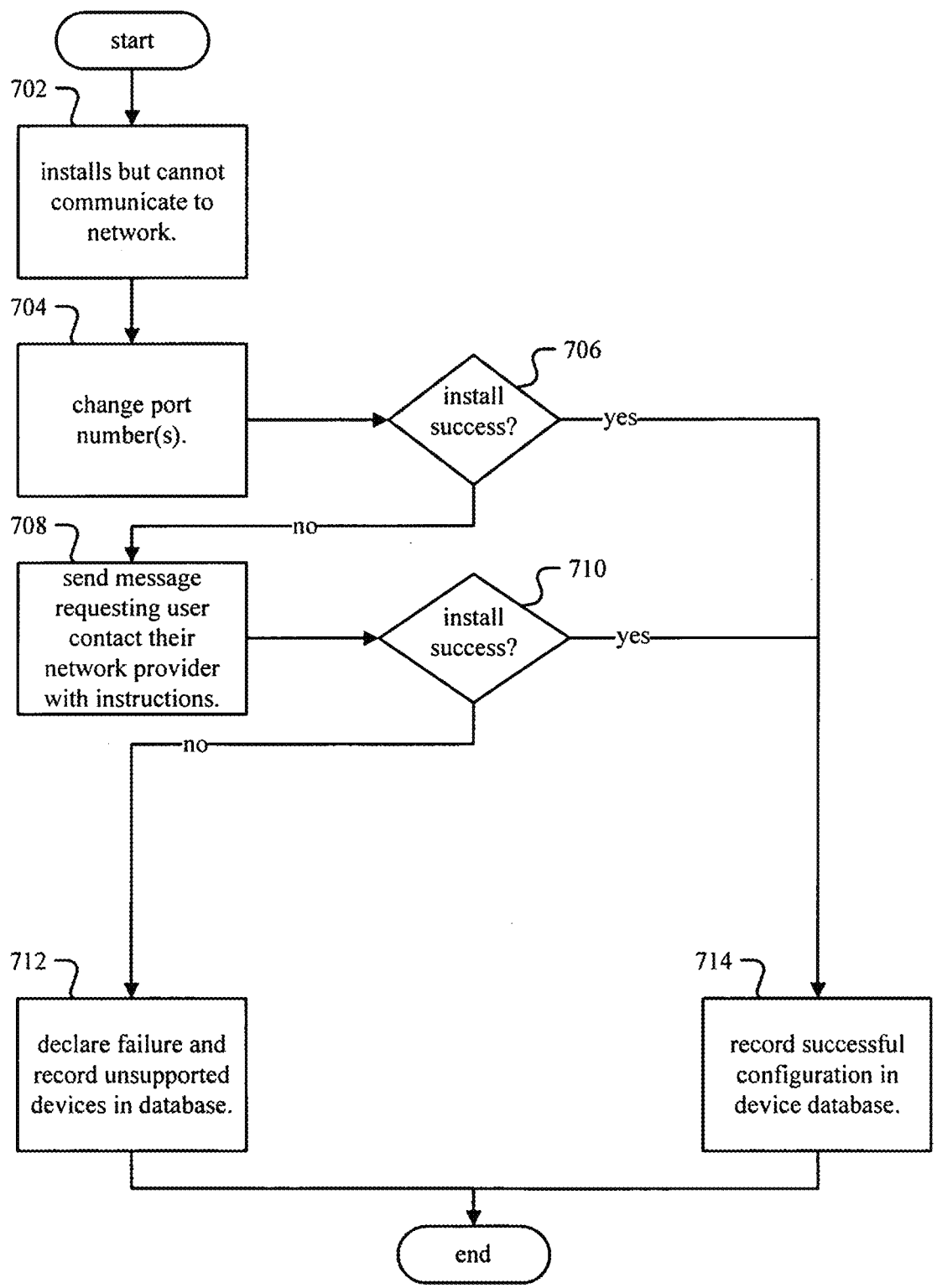
FIG. 7 is a flowchart illustrating an embodiment of a process for a service provider to attempt to repair connectivity problems.

FIG. 7 is a flowchart illustrating an embodiment of a process for a service provider to attempt to repair connectivity problems. In some embodiments, the process of FIG. 7 is included in 212 of FIG. 2. The process may be implemented in service provider server 108.

In a step 702, the installer server software 110 does not receive an initial communication over network 106 when the application first executes, indicating a connectivity error when the application installed was executed. In a step 704, the installer server software 110 updates the device database 112 for the mobile device 104 and its meta-data signature, and recompiles an application executable following step 208 but with a different port number. In some embodiments, the installer server software 110 cannot automatically re-install this new version of the application, but must send a "retry message" to the mobile device 104 to start the process from step 206, and in some embodiments this retry message is sent using a customized SMS message. If it is determined at step 706 that installation of the version with a different port number is successful, then control is transferred to step 714. If it is determined at step 706 that installation of the version with a different port number is unsuccessful, then control is transferred to step 708. In some embodiments, step 704 is repeated with several different tries for port numbers before control is transferred to step 708.

In a step 708, the installer server software 110 sends a message to the mobile device 104 requesting the user contact their network provider with specific instructions, and in some embodiments this message is sent using a customized SMS message. In some embodiments, the specific instructions include contacting a cellular phone carrier to activate or purchase access to the Internet for mobile device 104. In some embodiments, the specific instructions include contacting a cellular phone carrier to configure Java applications to use GPRS for mobile device 104. The final step in the specific instructions is a pointer to start the process from step 206. If it is determined at step 710 that installation of the application based on following the specific instructions is successful, then control is transferred to step 714. If it is determined at step 710 that installation of the application based on following the specific instructions is unsuccessful, then control is transferred to step 712.

In a step 712, the service provider server 108 declares the installation a failure and records the mobile device 104 and its meta-data signature in the device database 112 as an unsupported device.

In a step 714, the device database 112 is updated with an installation success for the corresponding mobile device 104 and its meta-data signature, and the template, components, and/or parameters used in its compilation. In some embodiments, a new template may be created in device database 112 based on an installation success.

Figure 8:
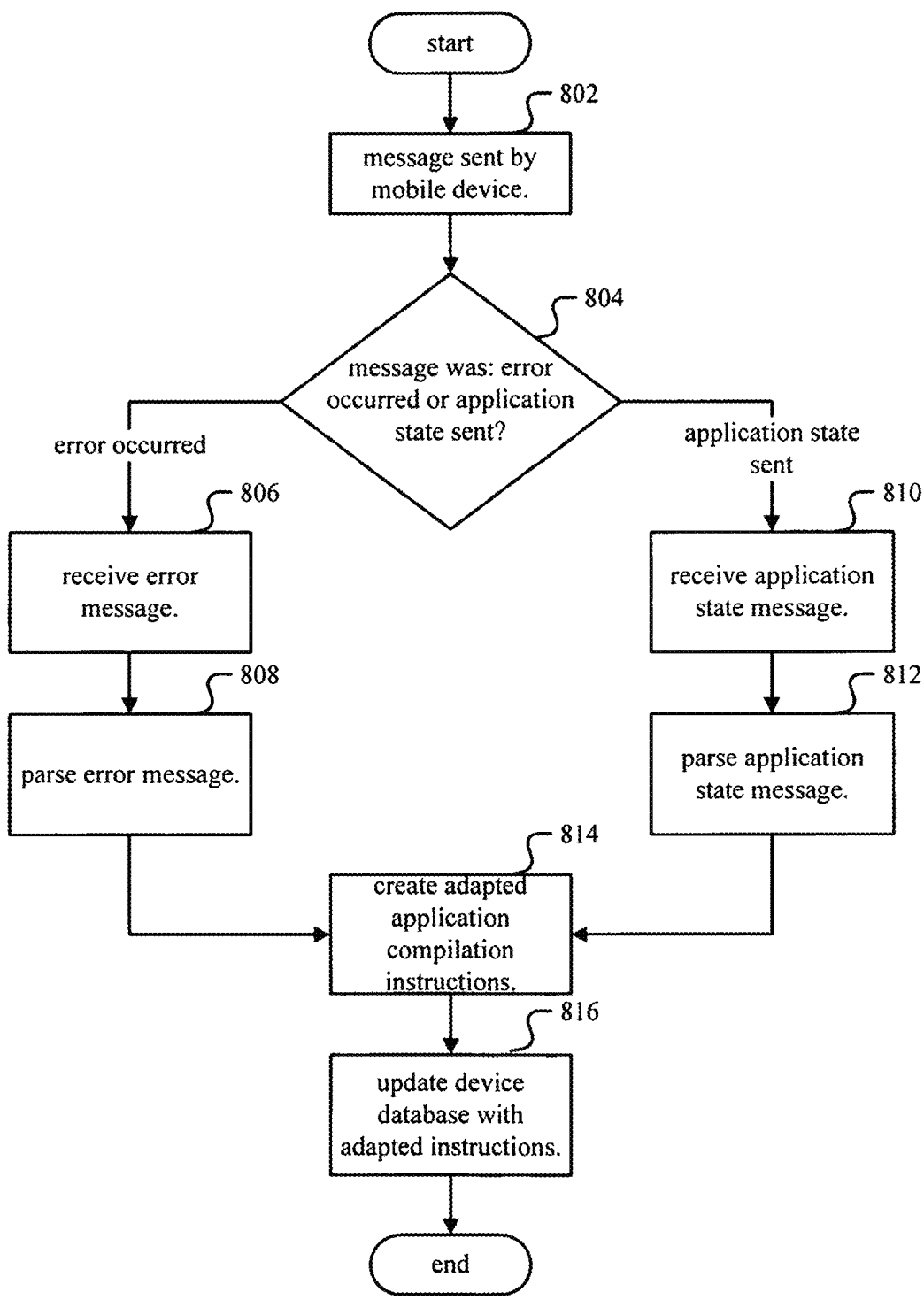
FIG. 8 is a flowchart illustrating an embodiment of a process for the service provider to continue to monitor and process feedback from the application on a mobile device.

FIG. 8 is a flowchart illustrating an embodiment of a process for the service provider to continue to monitor and process feedback from the application on a mobile device. In some embodiments, the process of FIG. 8 is included in 214 of FIG. 2. The process may be implemented in service provider server 108.

In a step 802, a message is sent by the mobile device 104. If in step 804, the message was that an error occurred, control is transferred to step 806. If in step 804, the message was that the application sent its state, control is transferred to step 810.

In a step 806, the installer server software 110 receives the error message. In a step 808, the installer server software 110 parses the error message. For example, an application can start receiving out of memory errors because the mobile device 104's meta-data indicates it has more memory than it actually does. In these cases the installer server software 110 will limit the memory usage for future installations to avoid this problem.

In a step 810, the installer server software 110 receives a message regarding the application state. In a step 812, the installer server software 110 parses the application state message. For example, during normal operation, it is useful for the application to send information such as the memory profile of the device and the timing of various application operations. This allows for more optimal planning of memory requirements for future installations by installer server software 110 and provides useful benchmarks between devices.

In a step 814, the installer server software 110 creates adapted application compilation instructions based on its parsing of the message. In a step 816, the installer server software 110 updates the device database 112 with the adapted instructions corresponding with the mobile device 104 and its meta-data signature.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:
receiving, by a processor, a request from a user of a mobile device for installing a version of an application on the mobile device;
transmitting, by the processor, a network request to the mobile device in response to receiving the request;
receiving, by the processor, a response to the network request from the mobile device, the response including a unique identification of the mobile device and resource description framework (RDF) information of the mobile device;
creating, by the processor, a metadata signature for the mobile device by parsing the response of the mobile device, the metadata signature including at least one feature present on the mobile device based at least in part on said RDF information;
retrieving, by the processor, a configuration of software components from an application component data store based on mapping the metadata signature to the configuration of software components, the configuration of software components being selected from multiple software components that can be assembled into variations of the application, the multiple software components providing functionality executed by the mobile device;
compiling, by the processor, the configuration of software components into a device version of the application, the compilation comprising adding the configuration of software components to a predefined application template and compiling the application template and software components into an application binary; and
communicating, by the processor, the device version of the application to the mobile device.

2. The method of claim 1, further comprising:
assigning, by the processor, a user identifier for the user of the mobile device; and
transmitting, by the processor, a customized pointer for the application to be installed on the mobile device, the customized pointer comprising the user identifier.

3. The method of claim 1, wherein creating, by the processor, the metadata signature for the mobile device comprising:
determining, based on the interrogation, if fundamental requirements are available on the mobile device.

4. The method of claim 1, wherein interrogating, by the processor, the mobile device upon receiving the request comprising:
sending a request for metadata to the mobile device; and
receiving the metadata from the mobile device.

5. The method of claim 4, wherein creating, by the processor, the metadata signature for the mobile device comprising:
parsing information from the received metadata for creating the metadata signature.

6. The method of claim 5, wherein the parsed information comprises carrier information for the mobile user device.

7. The method of claim 5, wherein the parsed information comprises a feature of the mobile user device.

8. The method of claim 5, wherein the parsed information comprises a specification of a resource available on the mobile user device.

9. The method of claim 5, wherein the parsed information comprises an error message relating to a failed prior deployment of the application.

10. The method of claim 5, wherein the parsed information comprises application state information from a prior version of the application.

11. The method of claim 1, further comprising:
determining, by the processor, if the mobile device is known or unknown based on existence of an entry for the metadata signature of the mobile device in a device database;
loading, by the processor, a corresponding device template that comprises the configuration of software components predetermined as currently optimal for the mobile device if it is determined that the mobile device is known; and
adding, by the processor, the configuration of software components based on the metadata signature if it is determined that the mobile device is unknown.

12. The method of claim 1, wherein the version of the application comprises a customized compiled executable file customized for execution on the mobile device.

13. A system comprising:
a processor; and
a memory coupled with the processor, wherein the memory comprising instructions for:
receiving a request from a user of a mobile device for installing a version of an application on the mobile device;
transmitting a network request to the mobile device in response to receiving the request;
receiving a response to the network request from the mobile device, the response including a unique identification of the mobile device and resource description framework (RDF) information of the mobile device;
creating, based on the interrogation, a metadata signature for the mobile device by parsing the response of the mobile device, the metadata signature including at least one feature present on the mobile device based at least in part on said RDF information;
retrieving a configuration of software components from an application component data store based on mapping the metadata signature to the configuration of software components, the configuration of software components being selected from multiple software components that can be assembled into variations of the application, the multiple software components providing functionality executed by the mobile device;
compiling the configuration of software components into a device version of the application, the compilation comprising adding the configuration of software components to a predefined application template and compiling the application template and software components into an application binary; and
communicating the device version of the application to the mobile device.

14. The system of claim 13, wherein the memory further comprising instructions for:
assigning a user identifier for the user of the mobile device; and
transmitting a customized pointer for the application to be installed on the mobile device, the customized pointer comprising the user identifier.

15. The system of claim 13, wherein creating the metadata signature for the mobile device comprising:
determining, based on the interrogation, if fundamental requirements are available on the mobile device.

16. The system of claim 13, wherein interrogating the mobile device upon receiving the request comprising:
sending a request for metadata to the mobile device; and
receiving the metadata from the mobile device.

17. The system of claim 16, wherein creating the metadata signature for the mobile device comprising:
parsing information from the received metadata for creating the metadata signature.

18. The system of claim 17, wherein the parsed information comprises carrier information for the mobile device.

19. The system of claim 13, wherein the memory further comprising instructions for:
determining if the mobile device is known or unknown based on existence of an entry for the metadata signature of the mobile device in a device database;
loading a corresponding device template that comprises the configuration of software components predetermined as currently optimal for the mobile device if it is determined that the mobile device is known; and
adding the configuration of software components based on the metadata signature if it is determined that the mobile device is unknown.

20. The system of claim 13, wherein the version of the application comprises a customized compiled executable file customized for execution on the mobile device.

21. A non-transitory computer readable-medium comprising processor-executable instructions for:
receiving a request from a user of a mobile device for installing a version of an application on the mobile device;
transmitting a network request to the mobile device in response to receiving the request;
receiving a response to the network request from the mobile device, the response including a unique identification of the mobile device and resource description framework (RDF) information of the mobile device;
creating, based on the interrogation, a metadata signature for the mobile device by parsing the response of the mobile device, the metadata signature including at least one feature present on the mobile device based at least in part on said RDF information;
retrieving a configuration of software components from an application component data store based on mapping the metadata signature to the configuration of software components, the configuration of software components being selected from multiple software components that can be assembled into variations of the application, the multiple software components providing functionality executed by the mobile device;
compiling the configuration of software components into a device version of the application, the compilation comprising adding the configuration of software components to a predefined application template and compiling the application template and software components into an application binary; and
communicating the device version of the application to the mobile device.

* * * * *